United States Patent [19]
French

[11] 3,848,651
[45] Nov. 19, 1974

[54] TIRE TREAD HAVING DRAINAGE CHAMBERS

[75] Inventor: Tom French, Sutton Coldfield, England

[73] Assignee: Dunlop Limited

[22] Filed: Sept. 12, 1972

[21] Appl. No.: 288,436

[30] Foreign Application Priority Data
Sept. 15, 1971 Germany.............................. 42869

[52] U.S. Cl............................................ 152/209 R
[51] Int. Cl............................................. B60c 11/06
[58] Field of Search.................................... 152/209

[56] References Cited
UNITED STATES PATENTS
2,575,439  11/1951  Billingsley........................ 152/209
3,511,290  5/1970  Kutsmichel........................ 152/209
3,532,147  10/1970  Gough............................... 152/209
3,550,665  12/1970  Verdier.............................. 152/209

Primary Examiner—James B. Marbert
Attorney, Agent, or Firm—Stevens, Davis, Miller & Mosher

[57] ABSTRACT

A tire having a plurality of wide drainage chambers in an axially outer tread rib which are each connected to the axially outer side of the rib by a narrow slot with a wide channel at the slot base. The drainage chambers and channels do not close up in the contact patch between tread and ground whereas the narrow slots do, of which the following is a Specification.

13 Claims, 4 Drawing Figures

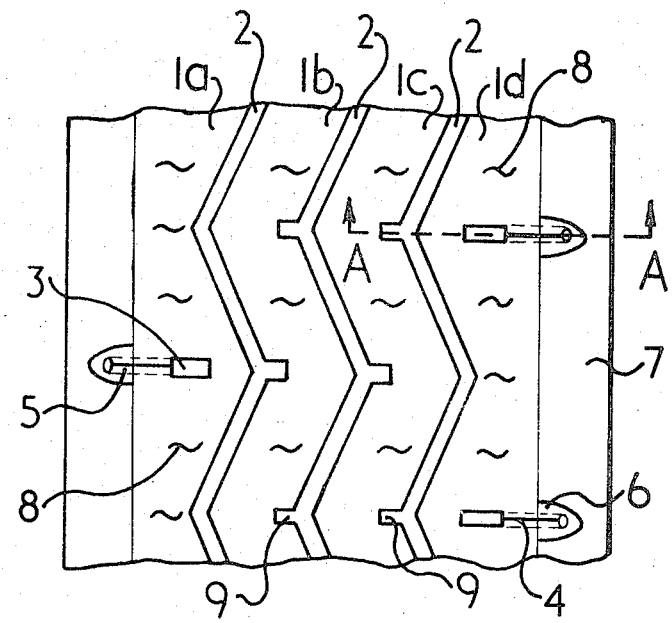
FIG. 1
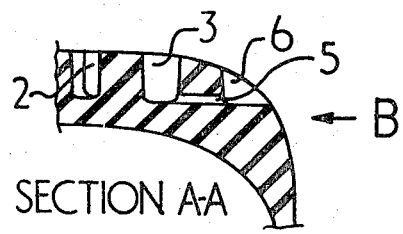
SECTION A-A
FIG. 2
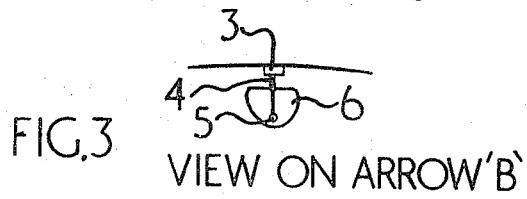
FIG. 3   VIEW ON ARROW 'B'

TIRE TREAD HAVING DRAINAGE CHAMBERS

This invention relates to tires especially, but not exclusively, to pneumatic tires provided with breakers.

Many pneumatic tires, esecially on-the-road tires are provided with circumferential ribs to ensure good wearing and other properties. It is desirable that these ribs should be relatively stiff to provide resistance to sideways forces e.g. on cornering, this being particularly so in the case of the ribs nearest to the tire shoulders which are subjected to the highest loads on cornering. In addition, in tires provided with a breaker it is also desirable that the outer ribs which are adjacent the breaker edges should be sufficiently stiff to counteract the sudden reduction in stiffness of the tread in these regions especially if the breaker comprises steel cords.

In order that the tire tread should have good wet-grip properties it is preferable that the ribs are provided with drainage means to remove that part of the water lying in the path of the tire not removed by the bow-wave effect of the tire moving through the water or by the main circumferential drainage grooves formed between the ribs. The drainage means may comprsie grooves, slots, chambers etc (see for example U K Patent Nos 1,101,135 and 1,132,352) all of which reduce the likelihood of skidding or aqua-planning on wet surfaces. However, the provision of the drainage means often reduces the desired stiffness, since they may divide or effectively divide the rib into relatively movable portions the extent to which the stiffness is reduced generally being greater as the drainage capacity is increased.

It is an object of the present invention to provide a tire having a construction which reduces or substantially overcomes the aforementioned disadvantages.

In accordance with the invention a tire comprises a tread portion having an axially outer circumferential thread rib provided with a plurality of wide drainage chambers, some at least of which are connected to wide axial drainage channels spaced radially inwards of the rib ground-contacting surface at the base of a narrow axial slot, said slot and channel extending to the axial outer side of the rib.

In the present context a chamber, channel, groove or slot in a tire tread is wide if, when the tire is inflated to its design pressure, and is subjected to its design load, the chamber, channel groove or slot remains open in the contact area between tread and ground; a chamber, channel, groove or slot is narrow if, under the same conditions it closes up in the contact area.

Preferably the chambers each have an axial width which is less than that of the rib in which they are located and are spaced apart from either side of the rib. Further, the axial width of the chambers is preferably less than half the axial width of the rib.

Preferably also the depth of the chambers is greater than that of their axial width and is substantially equal to the depth of at least one wide main circumferential drainage groove provided in the tire tread.

The chambers may comprise axially extending grooves having an axial length less than that of the width of the rib in which they are situated.

Preferably the axially outer side of each axially outer rib is bounded by a shoulder groove of such a shape that the rib and adjacent shoulder regions are formed with interengaging elements, a portion of one element engaging a recess in a further element, the elements becoming interlocked on application of and to resist a transverse load applied to the tire tread, as described in U K Patent No. 1,192,731.

The tire of this invention is thus provided with tread ribs adjacent its shoulders which are drained by drainage chambers of appreciable size while remaining adequately supported and stable under load.

The tire may be provided with breaker and may have a cross-ply or preferably a radial-ply carcass.

The tire may be moulded using a moulding matrix of corresponding shape.

Two embodiments of the invention, radial ply car tires each having a breaker of steel cord plies, will now be described by way of example with reference to the accompanying drawings.

FIG. 1 shows in plan part of the tread of the tire of the first embodiment,

FIG. 2 shows a cross-section on the line A—A through the shoulder of the tire in FIG. 1, FIG. 3 shows a side view in the direction of arrow 'B' of part of the shoulder of the tire in FIG. 1.

Figure 4:
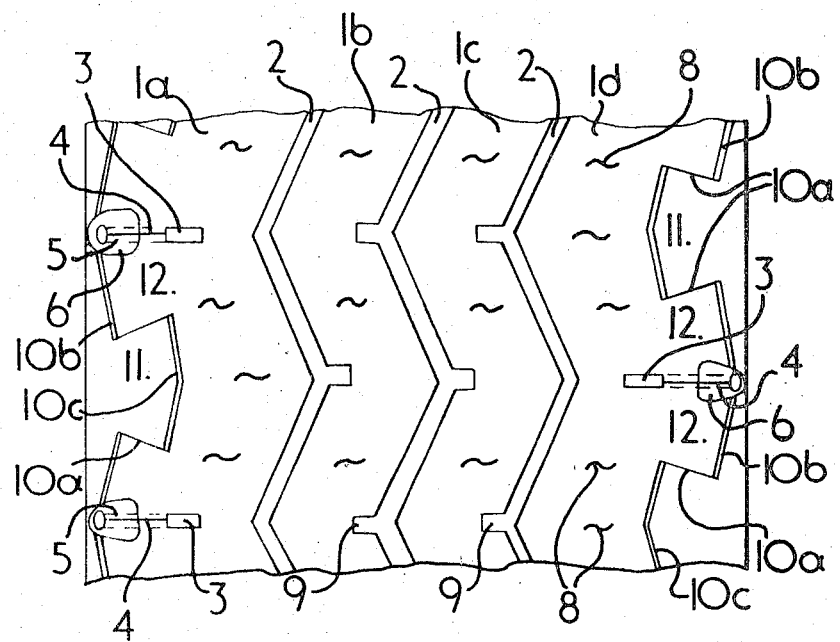
FIG. 4 shows in plan part of the tread of the tire of the second embodiment.

The tire of the first embodiment, shown in FIGS. 1, 2 and 3 comprises a radial ply carcass of rayon cords and a breaker comprising two layers of steel cords. The tire tread comprises four circumferential ribs 1a, 1b, 1c, 1d separated by three wide drainage grooves 2 of zig-zag configuration. For a 165 × 13 size tire the width of these grooves is typically 5 mm. These drainage grooves are of sufficient width not to close up in contact patch under normal operating conditions. Short axial grooves 9 of the same width as the drainage grooves 2 are provided at some of the apices of the drainage grooves 2.

The axially outermost ribs 1a and 1d are provided with a plurality of circumferentially spaced-apart drainage chambers 3 comprising short wide axially-extending grooves. These grooves are of approximately the same width and depth as the main circumferential grooves and their lengths in an axial direction are less than the axial width of the ribs 1a and 1d in which they are located i.e., about half the width of the rib. Typically, for a 165 ×—size tire, the chambers 3 may be 16 mm long by 4 mm wide, and 8 mm deep. Leading from each chamber to the axial outer edge of the rib is an axal slot 4 typically 1 mm wide for a 165 × 13 size tire having an enlargement in the form of a drainage channel 5 at its radial inner extremity. The drainage channel, for a 165 × 13 size tire is typically of circular cross-section of radius 1.5 mm. The channel thus leads from the base of the chamber 3 to the axially outer edge of the rib (1a or 1d). Each slot and channel extends to a depression 6 formed in the axially outer surface of the tire shoulder 7. The slot being of relatively narrow width closes up in the contact patch under normal operating conditions while the groove 3 and channel 5 remain open.

The ribs 1a, 1b, 1c, 1d, are also provided with a plurality of other slots 8 which also act as water reservoirs.

In operation of the tire on wet roads the bulk of water displaced by the tire is removed by the bow-wave and through the three main circumferential drainage grooves 2. A further relatively large amount is received by the drainage chambers 3 in the shoulder ribs and this is forced out sideways away from the contact area through the drainage channels 5 as the rubber adjacent the slots 4 distorts in the contact patch. The remaining thin film is soaked up by the other slots 8 and thrown out by centrifugal action as that part of the tire in which they are located moves out of the contact patch.

Because of the shape and relative size of the short axial grooves 3 and the associated drainage channels 5 the outer ribs 1a and 1d do not distort excessively under the influence of sideways forces and are sufficiently stiff to offset the reduction in tread stiffness at the edge of the steel breakers. At the same time, drainage of these ribs is maintained since the grooves 3 and channels 5 remain open.

The tire of the second embodiment, shown in FIG. 4 has an internal construction similar to the tire of the first embodiment. The tire tread is also similar to the tread of the tire of the first embodiment in that it comprises ribs 1a–1d, separated by wide drainage grooves 2 and formed with slots 8. The axially outer ribs are also provided with spaced apart drainage chambers 3 from which axial slots 4 with drainage channels 5 lead in an axially outwards direction.

The axially outer side of each axially outer rib is bounded by a shoulder groove 10 of dovetail formation. This is broken into three repeating parts 10a, 10b and 10c. The first part 10a is narrower than the remainder of the groove and extends at an angle of less than 45°, typically 30° to 35°, to a local radial plane which passes through the tire axis. The width of the part 10a of the shoulder groove is typically 0.33 mm. The depth varies between 3 mm and 9 mm, the shallower portions forming tie bars.

The second part 10b is divided into two parts, each extending at a small angle e.g. 17° to 20° to a local tire circumference into opposite sides of a shoulder depression 6.

The third part 10c is also divided into two parts but these meet at a large obtuse angle e.g. 150° or 155° to form a shallow 'V'. The width of parts 10b and 10c is typically 15 mm at the tire surface narrowing down to 0.33 mm at a depth of 3 mm below the surface. The total groove depth is typically 9 mm the groove width between depths of 3 mm and 9 mm remaining constant.

In operation of the tire of the second embodiment under the influence of a sideways force e.g. during cornering, the tension applied to the external surface of the rubber of the tire shoulder and tread as to comes into contact with the ground moves the dovetail shaped portions 11 and 12 and their corresponding closely fitting recesses relatively to one another so that they interlock with the adjacent walls of th recesses i.e., parts of the groove 10 close up, further displacement of the rubber then being comparatively greatly restricted with consequent advantages in respect of reduced tread wear. In addition due to the stiffening up of the shoulder of the tire when the dovetail portions and corresponding recesses interlock, a very positive steering force is obtainable which is considerably improved compared with tires not having this feature.

The widths and angles of the parts of the grooves 10 may be different from those just described but can still be such that the rubber on each side of the grooves is in the form of interengaging elements (in the embodiment just described, the dovetail shaped ribs) which interlock to provide mutual support under the influence of a sideways force e.g. on cornering.

In other respects, the operation of the tire is the same as that of the first embodiment.

Although two embodiments of the invention have been described other alternative constructions, in accordance with the invention are possible. For example, the chambers may comprise axial grooves of zig-zag configuration, at some of the apices of which are provided short slots. It will also be appreciated that many variations in the size and shape of the chamber and associated channel and slot provided in the rib within the scope of the invention exist, dependint on many variables such as rubber hardness, breaker stiffness and construction, and tread thickness.

Having now described my invention, what I claim is:

1. A tire comprising a tread portion having an axially outer circumferential tread rib, a plurality of circumferentially spaced apart wide drainage chambers provided in said circumferential rib, narrow axial slots extendng from at least some of the chambers to the axially outer side of the tire, and wide axial drainage channels connected to the chambers and spaced radially inwards from the ground-contacting surface of the rib at the base of the slots.

2. A tire according to claim 1 wherein the chambers each have an axial width less than that of the rib in which they are located.

3. A tire according to claim 1 wherein the chambers each have an axial width less than half that of the rib in which they are located.

4. A tire acording to claim 1 wherein the chambers are spaced apart from either side of the rib in which they are located.

5. A tire according to claim 1 wherein the depth of the chambers is greater than their axial width.

6. A tire according to claim 1 comprising at least one wqde circumferential groove in the tire tread, the depth of the chambers being substantially equal to the depth of the wide circumferential groove.

7. A tire according to claim 1 wherein the chambers comprise wide axially extending grooves.

8. A tire according to claim 1 wherein the chambers comprise wide axially extending zig-zag grooves.

9. A tire according to claim 1 wherein the axially outer side of each axially outer rib is bounded by a shoulder groove of such a shape that the rib and adjacent shoulder regions are formed with interengaging elements, a portion of one element engaging a recess in a further element, the elements becoming interlocked on application of and to resist a transverse load applied to the tire tread.

10. A tire according to claim 1 provided with a breaker.

11. A tire according to claim 1 provided with a radial ply carcass.

12. A tire according to claim 1 provided with a cross-ply carcass.

13. A tire according to claim 1 moulded using a moulding matrix of corresponding shape.

* * * * *

UNITED STATES PATENT OFFICE
CERTIFICATE OF CORRECTION

Patent No. 3,848,651                        Dated November 19, 1974

Inventor(s) Tom FRENCH

It is certified that error appears in the above-identified patent and that said Letters Patent are hereby corrected as shown below:

Column 2, line 45, remove "—" before the word "size", and insert --13--.

Signed and sealed this 11th day of February 1975.

(SEAL)
Attest:

RUTH C. MASON  
Attesting Officer

C. MARSHALL DANN  
Commissioner of Patents  
and Trademarks